United States Patent [19]

Rutan et al.

[11] Patent Number: 5,395,073
[45] Date of Patent: Mar. 7, 1995

[54] STOL/VTOL FREE WING AIRCRAFT WITH ARTICULATED TAIL BOOM

[75] Inventors: Elbert L. Rutan, Mojave, Calif.; Hugh J. Schmittle, Silver Spring, Md.

[73] Assignee: Freewing Aerial Robotics Corporation, College Park, Md.

[21] Appl. No.: 7,130

[22] Filed: Jan. 22, 1993

Related U.S. Application Data

[63] Continuation-in-part of Ser. No. 850,913, Mar. 13, 1992.

[51] Int. Cl.⁶ .............................................. B64C 3/38
[52] U.S. Cl. ..................................... 244/48; 244/7 R; 244/38; 244/39
[58] Field of Search ............. 244/7 B, 7 C, 7 R, 23 R, 244/38, 39, 48

[56] References Cited

U.S. PATENT DOCUMENTS

| Re. 18,181 | 9/1931 | Stelzer | 244/38 |
|---|---|---|---|
| 1,016,929 | 2/1912 | Black | 244/38 |
| 1,083,464 | 1/1914 | Roche | 244/82 |
| 1,132,503 | 3/1915 | Wittkowski | 244/80 |
| 1,472,103 | 10/1923 | De. V. Vandevelde | 244/48 |
| 1,771,257 | 7/1930 | Ingram | 244/48 |
| 1,772,586 | 8/1930 | Wilford | 244/37 |
| 1,845,307 | 2/1932 | Maxwell | 244/7 C |
| 1,861,336 | 5/1932 | Cox | 244/7 C |
| 1,906,005 | 4/1933 | Hall | 244/48 |
| 2,058,678 | 10/1936 | Fry | 244/17.7 |
| 2,063,030 | 12/1936 | Crouch | 244/7 C |
| 2,066,649 | 1/1937 | Sabins | 244/38 |
| 2,082,674 | 6/1937 | Young | 244/82 |
| 2,118,987 | 5/1938 | Smith | 244/48 |
| 2,347,230 | 4/1944 | Zuck | 244/82 |
| 2,362,224 | 11/1944 | Roseland | 244/48 |
| 2,416,958 | 3/1947 | Sears | 244/13 |
| 2,438,309 | 3/1948 | Zimmerman | 244/13 |
| 2,481,379 | 9/1949 | Zimmerman | 244/7 B |
| 2,536,298 | 8/1951 | Winslow | 244/75 R |
| 2,541,922 | 2/1951 | Hosford | 244/82 |
| 2,580,312 | 12/1951 | Moore | 244/7 C |
| 2,584,667 | 2/1952 | Bockrath | 244/38 |
| 2,623,712 | 12/1952 | Spratt | 244/48 |
| 2,708,081 | 5/1955 | Dobson | 244/7 C |

(List continued on next page.)

FOREIGN PATENT DOCUMENTS

| 790597 | of 1935 | France . |  |
|---|---|---|---|
| 997796 | of 1952 | France . |  |
| 7209 | 12/1909 | United Kingdom . |  |
| 375530 | 6/1932 | United Kingdom | 244/48 |
| 732657 | 6/1955 | United Kingdom . |  |

OTHER PUBLICATIONS

NASA Contractor Report 2946, "Analytical Study of a Free-Wing/Free-Trimmer Concept", Porter et al, Feb. 1978, pp. v–115.
NASA Contractor Report 3135, "Extended Analytical Study of the Free-Trimmer Concept," Porter et al, 1979, pp. iii–85.

Primary Examiner—Michael S. Huppert
Assistant Examiner—Anne E. Bidwell
Attorney, Agent, or Firm—Lowe, Price, LeBlanc & Becker

[57] ABSTRACT

A VTOL/STOL free wing aircraft includes a free wing having wings on opposite sides of a fuselage connected to one another respectively adjacent fixed wing inboard or center root sections fixedly attached to the fuselage for free rotation about a spanwise access. Horizontal and vertical tail surfaces are located at the rear end of a boom assembly rotatably connected to the fuselage. A gearing or screw rod arrangement controlled by the pilot or remote control operator selectively relatively pivots the fuselage in relation to the tail boom assembly to enable the fuselage to assume a tilted or nose up configuration to enable VTOL/STOL flight.

21 Claims, 18 Drawing Sheets

U.S. PATENT DOCUMENTS

| | | | |
|---|---|---|---|
| 2,959,373 | 11/1960 | Zuck | 244/7 C |
| 2,960,285 | 11/1960 | Lopez | 244/82 |
| 3,006,582 | 10/1961 | Geiger | 244/82 |
| 3,035,789 | 5/1962 | Young | 244/7 C |
| 3,166,271 | 1/1965 | Zuck | 244/7 C |
| 3,236,182 | 2/1966 | Dahm | 244/3.24 |
| 3,415,469 | 12/1968 | Spratt | 244/48 |
| 3,430,894 | 3/1969 | Strand et al. | 244/7 C |
| 3,477,664 | 11/1969 | Jones | 244/16 |
| 3,561,702 | 2/1971 | Jones | 244/16 |
| 3,587,770 | 6/1971 | Flower | 180/117 |
| 3,730,459 | 5/1973 | Zuck | 244/48 |
| 3,795,373 | 1/1974 | Gerard | 244/48 |
| 4,124,180 | 11/1978 | Wolowicz | 244/82 |
| 4,145,132 | 11/1983 | Shirk | 244/48 |
| 4,568,043 | 2/1986 | Schmittle | 244/48 |
| 4,596,368 | 6/1986 | Schmittle | 244/48 |
| 4,730,795 | 3/1988 | David | 244/6 |
| 4,928,907 | 5/1990 | Zuck | 244/6 |
| 4,967,984 | 11/1990 | Allen | 244/35 R |
| 5,086,993 | 2/1992 | Wainfan | 244/48 |
| 5,098,034 | 2/1992 | Lendriet | 244/39 |

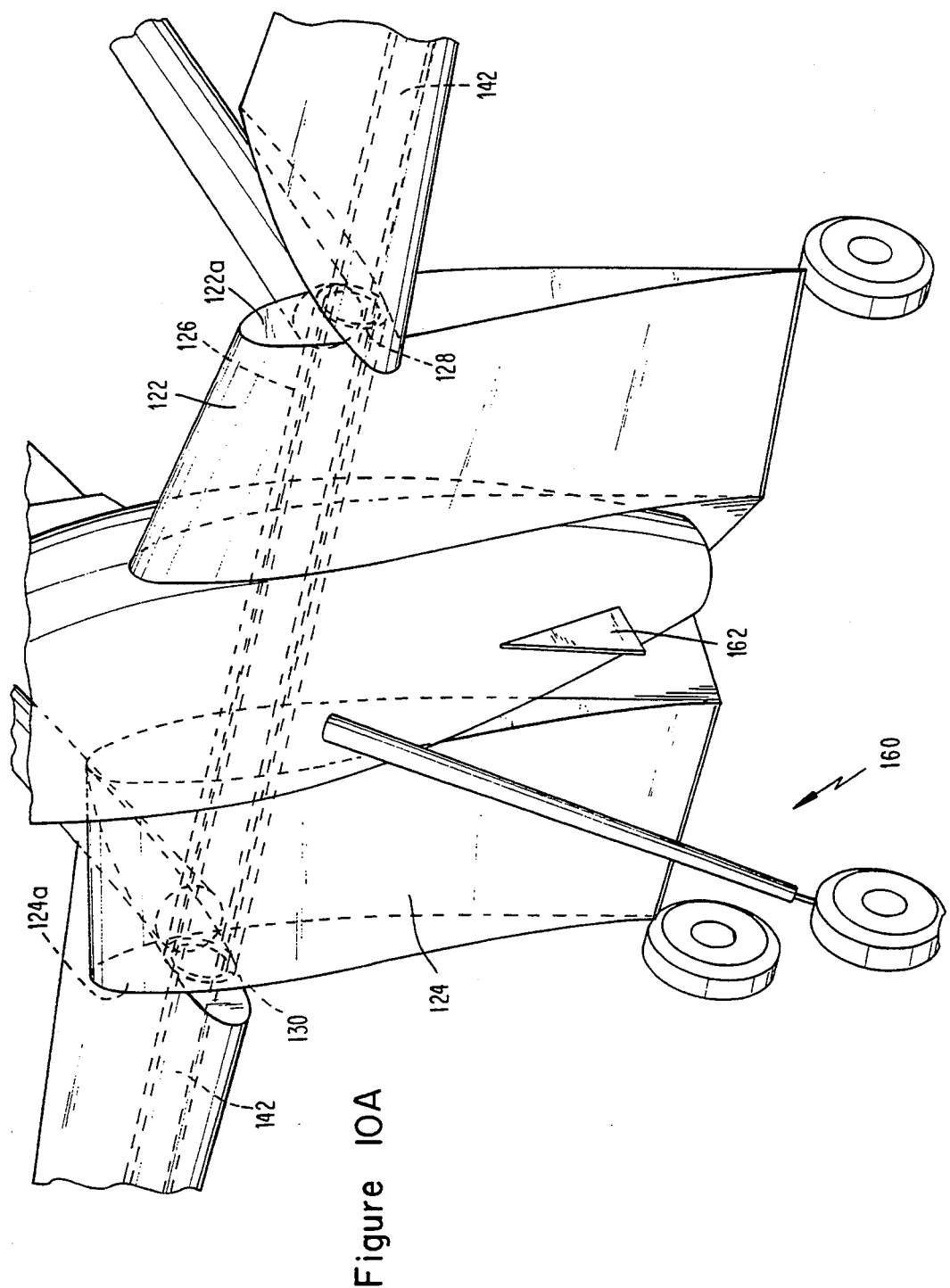

STOL/VTOL FREE WING AIRCRAFT WITH ARTICULATED TAIL BOOM

RELATED APPLICATIONS

The present application is a continuation-in-part of co-pending prior application Ser. No. 07/850,913, filed Mar. 13, 1992, entitled "VTOL Free Wing Aircraft," the disclosure of which is incorporated by reference herein in its entirety.

TECHNICAL FIELD

The present invention relates generally to short field and vertical take-off and landing (STOL/VSTOL) aircraft and, more particularly, to a STOL/VTOL aircraft having a fuselage with a tail rudder section which is articulated, relative to the fuselage, for movement out of the thrust line of a propulsion system for use in transitioning between STOL and straight and level flight.

BACKGROUND ART

Referring to FIG. 1, there is depicted a STOL/VTOL free wing aircraft 10 of the invention disclosed in the aforementioned co-pending application, which comprises a fuselage 12, a tail section 14 and a free wing 16 with a propulsion system including an engine 18 at the forward end of the fuselage for driving a propeller 20. As used in this present specification, a free wing or "freewing" is a wing attached to an aircraft fuselage in a manner such that the wing is freely pivotable about its spanwise axis forward of its aerodynamic center. This arrangement enables the wing to have an angle of attack which is determined solely by aerodynamic forces acting on the wing. Rotation of the wing, without pilot intervention, induced by changes in the direction of relative wind over the wing surfaces, causes the angle of incidence between the wing and the aircraft fuselage to vary so that the wing presents a substantially constant angle of attack to the relative wind which, in horizontal flight, enables the aircraft to be essentially stall free.

The free wing 16 is free to rotate or pivot about its spanwise axis 22 forward of its aerodynamic center. Free wing 16 includes left and right wings 16a and 16b extending from opposite sides of fuselage 12; these wings are coupled together to collectively freely pivot about axis 22. The left and right wings 16a,16b may be adjustable in pitch relative to one another as disclosed in the aforesaid application, the relevant disclosure of which is incorporated by reference herein. Aircraft 10 further includes rudders 24 and elevators 26 in tail section 14 which may be controlled in a conventional manner for yaw and pitch control, respectively. Further, while a single propeller for the propulsion system is illustrated at 20 in FIG. 1, it will be appreciated that other types of propulsion systems may be utilized, such as counter-rotating propellers and multi-engine arrangements attached to the fuselage. As used in this present specification, the term "common propulsion system" means the same propulsion system for supplying the necessary thrust for both horizontal and vertical flight operations and is not necessarily limited to a single thrust producing system, such as a single propeller, but could include multiple thrust producing systems such as a pair of engines driving separate propellers, provided that the multiple thrust producing systems are used for supplying thrust in both vertical and horizontal flight modes.

The operation of the VTOL free wing aircraft 10 is as follows. At launch, the aircraft 10 is mounted in a vertical orientation such as depicted in FIG. 1, on a rail system schematically depicted at 60. Rail system 60 may comprise simply a guide or a track with complementary guide or track following members on the aircraft 10 for guiding the aircraft from vertical movement for a limited initial predetermined distance at lift-off. With the engine started and propeller backwash providing an air flow over the wings 16a,16b, aircraft 10 lifts off of launch rail 60. Catapult assists may be provided. Yaw and pitch controls are maintained by rudder 24 and elevator 26, respectively. Roll control is achieved by differential setting of the pitch of the free wings 16a,16b under pilot or computer control or remote control from a remote controller station (not shown). The air flow over wings 16a,16b provides dynamic forces on the wings to control the roll of the aircraft 10 during launch. The wings 16a,16b at launch are freely rotatable and the dynamic pressure on all control surfaces as a result of backwash from the propulsion system is intended to allow roll, pitch and yaw control over the aircraft 10 during the initial phases of vertical launch.

To transition from vertical to horizontal flight, the pilot, computer or remote controller gives a down elevator signal, causing the fuselage to pitch toward a horizontal orientation. By pitching the fuselage, the thrust vector also inclines from the vertical and thus has a horizontal thrust component. As the fuselage pitches toward the horizontal, the horizontal speed of the aircraft increases, causing the freely rotatable wing 16 to rotate relative to the fuselage in accordance with the relative wind. The effects of the relative wind acting on the freely rotating wing 16a,16b quickly overcome the effects of the airflow over the wings from the propulsion system and, with increasing horizontal speed, the wing develops lift. The aircraft 10 soon transitions into horizontal flight in a free wing flight mode.

Should the aircraft 10 lose power during launch or vertical flight, the aircraft will rapidly and automatically transition into a horizontal flight mode with minimum altitude loss. When power is lost, free wing 16 weathervanes into the new relative wind, which would appear to the wing to be coming vertically upwardly from the ground, and thus obtains a leading edge down orientation while the fuselage will be oriented into the relative wind by the action of the rudder and elevators. Because the free wings use positive pitching moment airfoils, the aircraft will quickly transition itself into stable level flight.

During horizontal flight, pitch, yaw and roll control are provided by the elevators, rudders and differentially pivoted wings 16a and 16b. Ailerons may be provided on wing 16 if desired.

To transition from horizontal to vertical flight, the reverse procedure is employed. That is, an up elevator command is given to rotate the fuselage toward a vertical orientation with its nose pointed upwardly. Horizontal speed is thus decreased and a vertical thrust vector is introduced. Accordingly, the relative wind changes and the free wing and fuselage ultimately both rotate into a vertical orientation. If the aircraft resists slowing and does not reduce its forward or horizontal speed sufficiently, the fuselage, by operation of the elevator, could be rotated past vertical so that the thrust line serves as a thrust reverser, slowing the aircraft past stall. Alternatively, the mechanism of prior co-pending application Ser. No. 07/795,329, filed Nov. 20, 1991, entitled "Lockable Free Wing Aircraft," the disclosure of which is incorporated by reference herein in its entirety, may be utilized. That is, the wing could be locked to the fuselage before rotating the fuselage up. By stalling the aircraft and, hence, achieving a reduction to zero forward horizontal air speed, followed by release to the free wing state upon stalling, the aircraft may be positioned in the vertical orientation. A further alternative to reduce horizontal speed while transitioning from horizontal to vertical flight is to provide wing devices such as spoilers or elevators at the trailing edge of the wing. Still further, a canard could be located in the nose of the fuselage to provide leverage to the fuselage to transition to the vertical. A canard, of course, could be recessed within the nose of the aircraft and displaced outwardly of the aircraft at the time of the transition to leverage the fuselage upwardly. The canard, of course, in any event could be a free wing or fixed. Once vertical or near vertical flight is achieved, the pitch, roll and yaw commands again control the position of the aircraft to a location directly over a net 66. When located over the net, the engine is turned off and the aircraft drops into the net.

Since the tail section is fixed to the fuselage and thereby immovable relative to the longitudinal axis and the thrust axis of the fuselage, relatively sophisticated launch (take-off) and recovery (landing) systems are necessary, such as the launch rail system 60 mentioned above for take-off, and netted recovery systems to land the VTOL aircraft 10 such as depicted in FIG. 6 of the prior application, said drawing figure and related written description being incorporated by reference herein in its entirety. In the alternative, extremely long and complex landing gear extending downwardly below the tail section 14 in the vertical flight mode of FIG. 1 would be necessary for STOL and VTOL operations. This type of landing gear (e.g., a so-called moon rocket landing gear) would be extremely expensive and effective for use only on substantially level terrain.

It is accordingly one object of the present invention to provide a free wing aircraft having vertical and short take-off and landing capabilities (STOL/VTOL) and which does not require external launch and recovery systems.

Another object is to provide a STOL/VTOL free wing aircraft having a thrust line movable between vertical and horizontal orientations without affecting the relative horizontal positioning of at least flight control surfaces located in the tail section to enable use of relatively non-complex and short landing gear.

DISCLOSURE OF THE INVENTION

A free wing aircraft, according to the present invention, comprises a fuselage including a source of propulsion for propelling the aircraft in horizontal flight and in a short field take-off and landing (STOL) flight mode. A free wing is connected to the fuselage for free pivotal movement relative to the fuselage about a spanwise axis extending forwardly of the aerodynamic center of the wing. A tail boom is connected to the fuselage. The tail boom is formed with horizontal tail surfaces and vertical tail surfaces to provide for directional stability and yaw control. A mechanism is provided for relatively rotating the fuselage relative to the tail boom about an axis of rotation extending parallel to or coincident with the spanwise axis.

The relatively rotating mechanism is operable to position the thrust line of the fuselage into an angle approaching, or of, 90° relative to a longitudinal axis of the tail boom to enable the thrust of the propulsion system to propel the aircraft in the STOL flight mode.

In accordance with one embodiment of the invention, forward portions of the boom are connected to the fuselage and the tail surfaces are located at the rearwardly extending portions of the boom. In this manner, the tail surfaces are positioned out of the propulsion slip stream in STOL flight mode and provide for directional stability and yaw control as a result of relative wind induced dynamic pressure acting on the tail surfaces under low horizontal flight component speeds.

In accordance with another embodiment of this invention, the tail surfaces may be immovable relative to the tail boom.

The aircraft may further comprise landing wheels connected to the fuselage to project therebelow in the tilted up or STOL orientation of the fuselage relative to the tail boom.

The aircraft further comprises left and right fixed wing center or root sections fixedly attached to the fuselage. The free wing preferably includes left and right free wing members respectively extending from the left and right fixed wing center sections and which are freely rotatable relative thereto.

In accordance with a further aspect of this invention, means is provided for selectively controllably rotating at least one of the left and right free wings relative to the other of said wings for roll control without impeding the pivotal movement thereof.

In accordance with yet a further aspect of this invention, a free wing support tube means extends transversely through the fuselage and fixed wing sections along the spanwise axis and into the left and right free wings to define a support system therefor on the fuselage. The free wing support tube means may be a single tube supported in the fuselage and/or the fixed wing sections on bearings to allow for free pivotal movement of the free wings as a result of rotation of the tube about its longitudinal axis caused by relative wind acting on the free wing surfaces. In an alternative embodiment, a pair of tubes may respectively extend from the left and right free wings into the left and right fixed wing center sections and the fuselage for connection to a means for selectively controllably rotating at least one of the left and right free wings relative to the other of said wings for roll control without impeding the free pivotal movement thereof.

The tail boom preferably includes a cross tube extending transversely through the fuselage and fixed wing center sections. The tail boom cross tube is rotatable about its longitudinal axis via bearings mounted within the fuselage or fixed wing center sections. A pair of tail boom members respectively attached to opposite ends of the cross tube project rearwardly therefrom, and the tail surfaces are formed at distal ends of these boom members.

In a preferred embodiment of this invention, the tail boom cross tube extends transversely through a rear portion of the fuselage in rearwardly spaced relation to the free wing axis of rotation. Portions of the tail boom members also extend forwardly from the tail boom cross tube, and two pairs of landing wheels are respectively mounted to the tail boom members in tandem spaced relationship. At least the front pair of landing wheels are mounted to the forwardly extending portions to define a stable platform on the ground which enables the aircraft to resist yawing or directional instability under cross wind conditions.

A method of controlling an aircraft in horizontal and generally vertical flight modes is also disclosed. The method comprises the steps of selectively positioning the longitudinal axis of the fuselage and the thrust line in a generally vertical direction while the longitudinal axis of the tail surfaces extends generally horizontally, out of the path of movement of the fuselage, to enable STOL or VTOL flight. When the fuselage longitudinal axis is rotated to be coincident with the longitudinal axis of the tail surfaces, the aircraft is capable of normal straight and level flight at conventional horizontal air speeds.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 10a is a perspective view similar to FIG. 6 with the fuselage and center wing fixed wing center sections disposed between the left and right free wing sections and with the pivoting gearing arrangement of FIG. 10 obscured;

BEST MODE FOR CARRYING OUT THE INVENTION

Figure 1:
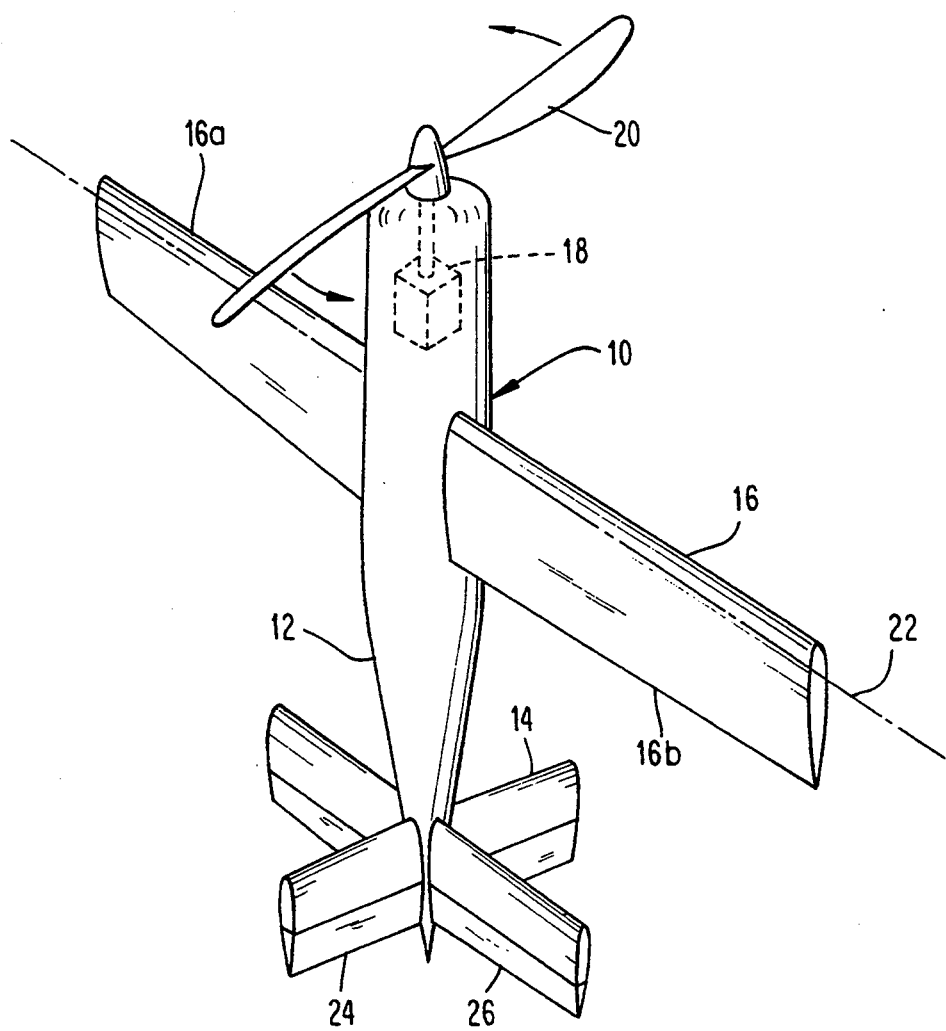
FIG. 1 is a perspective view of the VIOL free wing aircraft disclosed in the prior application, depicted in a vertical flight orientation.

FIGS. 2-11 constitute an illustration of one embodiment of a free wing aircraft 100 according to the present invention which is capable of short field takeoffs and landings (STOL) and straight and level flight and, with some minor modifications discussed below, vertical take-offs and landings (VTOL) as well. The free wing aircraft 100 comprises a fuselage 102 containing a propulsion system 104 including an engine 106 at the forward end of the fuselage rotating a propeller 108. A free wing 110 is connected to the fuselage 102 and is free to rotate or pivot about its spanwise axis 112 located forward of its aerodynamic center. The free wing 110 includes left and right wings 114 and 116 extending from a fixed wing root or center section 117 formed on opposite sides of the fuselage 102 and which left and right wings are coupled together in the unique manner described below to collectively freely pivot about the spanwise axis 112. The left and right wings 114,116 may be adjustable in pitch relative to one another in the manner described in the aforesaid '913 patent application, or may be formed with elevons (not shown) to provide for elevator and aileron control. The aircraft 100 further comprises a tail section 118 which, in accordance with a unique feature of the present invention, is mounted to a boom assembly 120 pivotally connected or articulated to the fuselage 102 for movement relative to the fuselage both into and out of alignment with the thrust line T of the propulsion system 104 to enable STOL/VTOL operations as well as straight and level flight.

More specifically, with particular reference to FIGS. 2, 9, 10 and 10A, the fixed wing center section 17 of the fuselage 102 comprises left and right hand fixed wing root portions 122 and 124 which are rigidly and non-rotatably attached to the fuselage sides for rotation with the fuselage relative to the spanwise axis 112. This spanwise axis 112 is defined by an outer tube 126 (FIGS. 10 and 10A) which extends transversely through the fuselage 102 and the fixed wing center sections 122,124 in a direction perpendicular to the aircraft longitudinal axis. The opposite outer ends 128 and 130 of this outer tube 126 may terminate at, or preferably be flush with, the leading outer side edges 122a and 124a of the fixed wing center portions 122,124 for rigid connection (e.g., welded attachment) to the forward ends 132 of a pair of parallel booms 134 (FIG. 10) of boom assembly 120 projecting rearwardly therefrom. The rear end 136 (FIGS. 2 and 3) of each boom 134 supports the horizontal and vertical stabilizing members 138 and 140 of the tail section 118 which are described more fully below. The outer cross tube 126 defines the forwardmost end of tail boom assembly 120 as well as the pivot axis therefor which is coincident with spanwise axis 112 in this embodiment.

The freewing 116 is connected to fuselage 102 through a connecting tube 142 which defines spanwise axis 112 and extends coaxially through the boom cross tube 126. Connecting tube 142 is thus rotatable on tube 126 about the spanwise axis 112 and has opposite end portions which respectively project outwardly from the fixed wing center sections 122,124 into the left and right free wings 114,116 to define the spanwise axis of the free wing assembly 110 for co-rotation of the left and right wings. Therefore, it can be seen that the left and right wings 114,116 are coupled together through, and supported by, the inner tube 142 extending within the outer tube 126 through the fixed wing center sections 122,124 to collectively freely pivot about the spanwise axis 112 independent of the attitude of the fuselage 102 and fixed wing sections.

Figure 4:
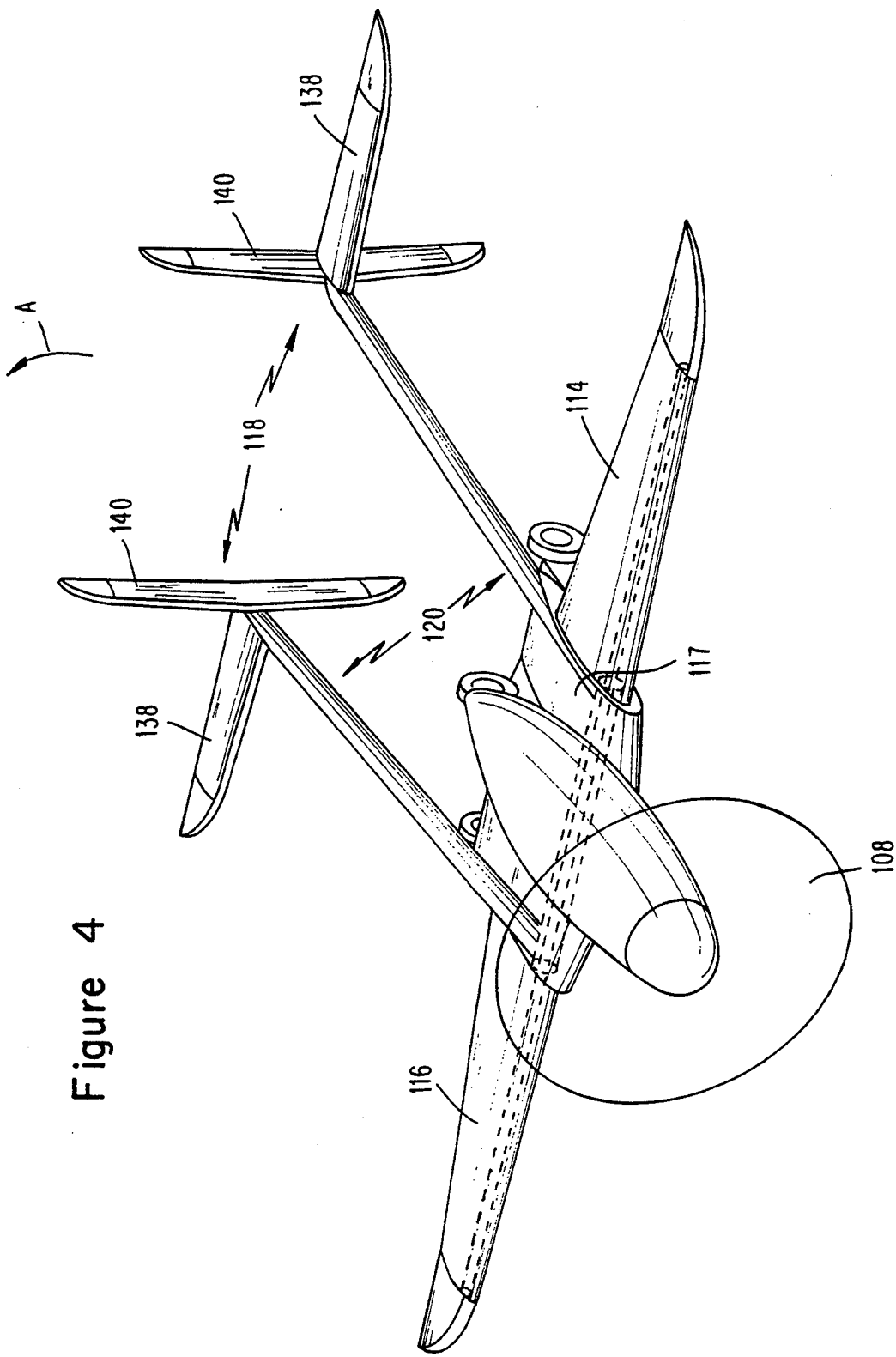
FIG. 4 is a perspective view of the aircraft in the straight and level flight modes of FIGS. 2 and 3.
Figure 5:
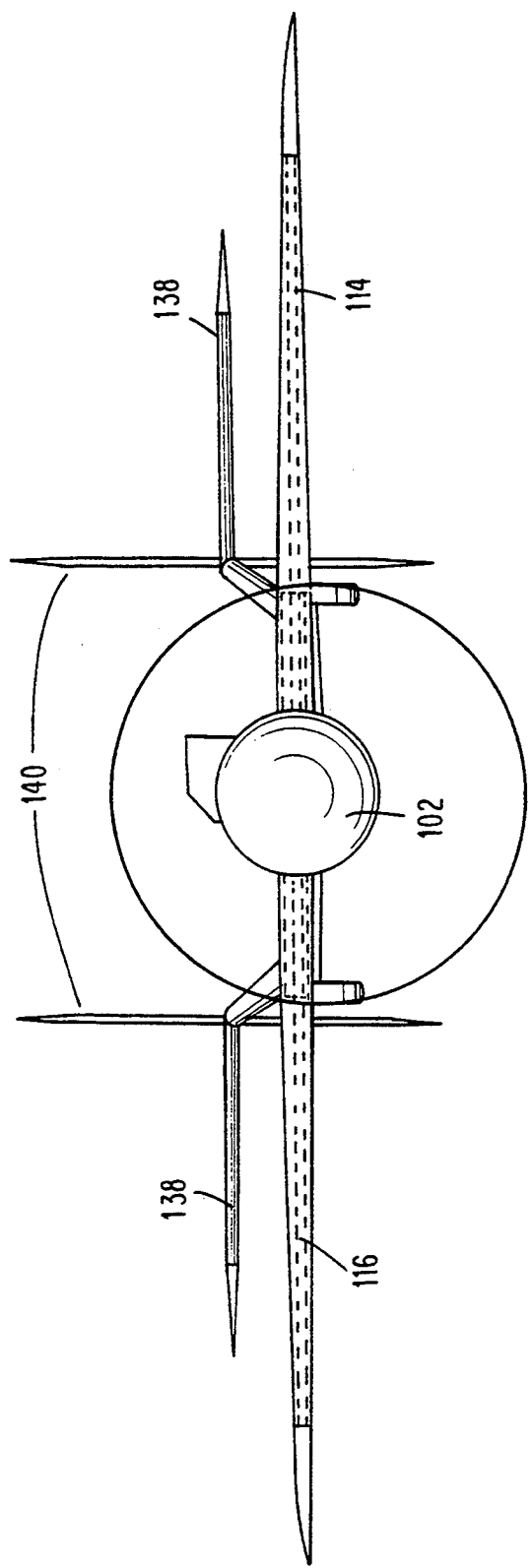
FIG. 5 is a front elevational view of the aircraft of FIGS. 2-4.
Figure 6:
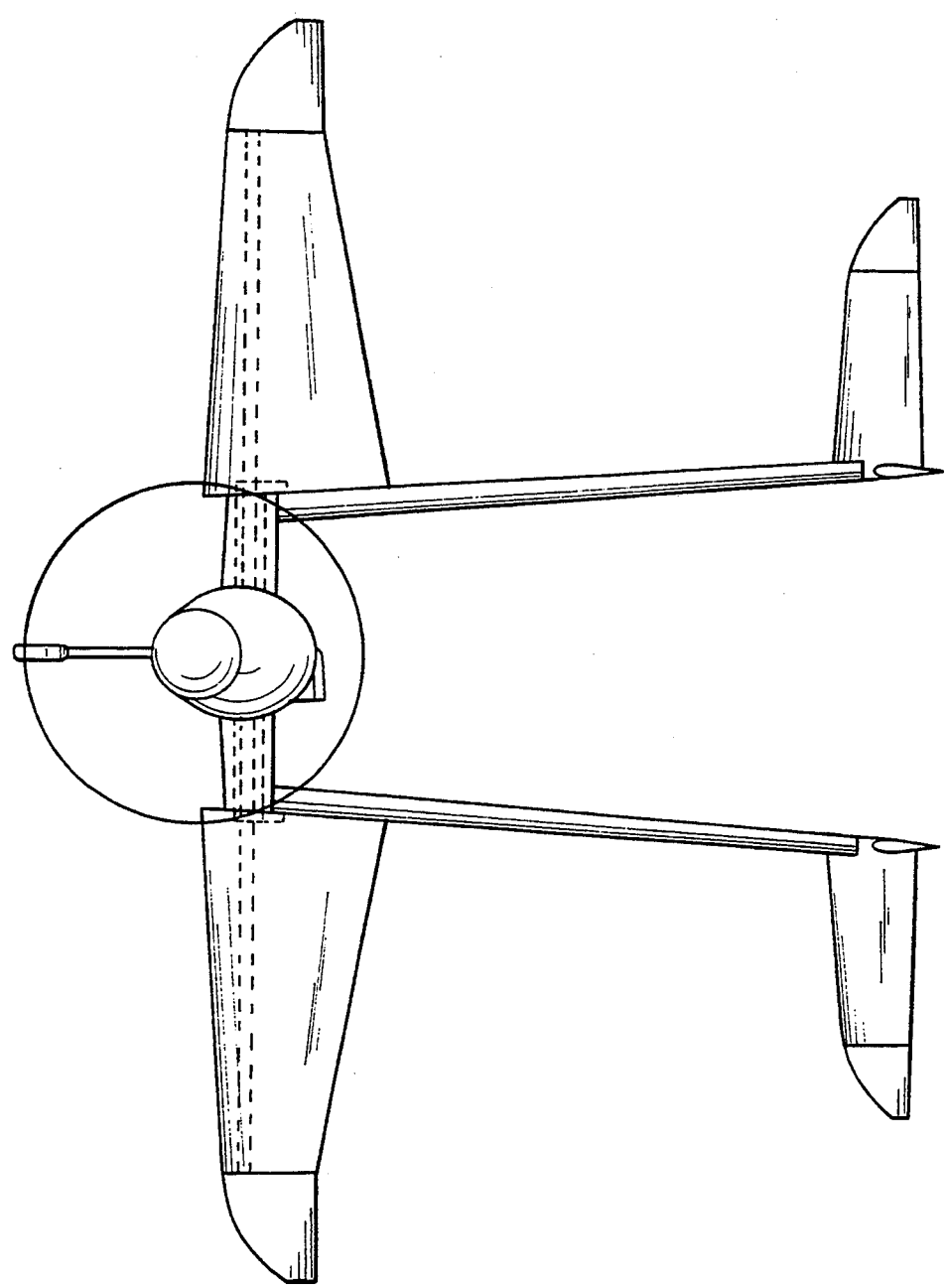
FIG. 6 is a top plan view of the aircraft of FIGS. 2-5, wherein the fuselage is in the tilted up or VIOL/STOL orientation.

In the alternative, the single tube 142 connecting free wings 114,116 to the fuselage 102 may be substituted with left and right tubes (not shown) which may be connected together within the fuselage 102 to a wing pitch adjustment mechanism for adjusting the pitch of the left and right wings 114,116 relative to one another. Such a mechanism is depicted in FIG. 4 of the co-pending '913 application, incorporated by reference herein in its entirety. As will now occur to one of ordinary skill in the art, such left and right inner tube members may be connected to a wing pitch adjustment mechanism such as by forming the outer tube 126 into two separate sections (not shown), respectively attached to the booms 134, to provide clearance for the pitch adjustment mechanism between these outer tube sections.

Figure 10:
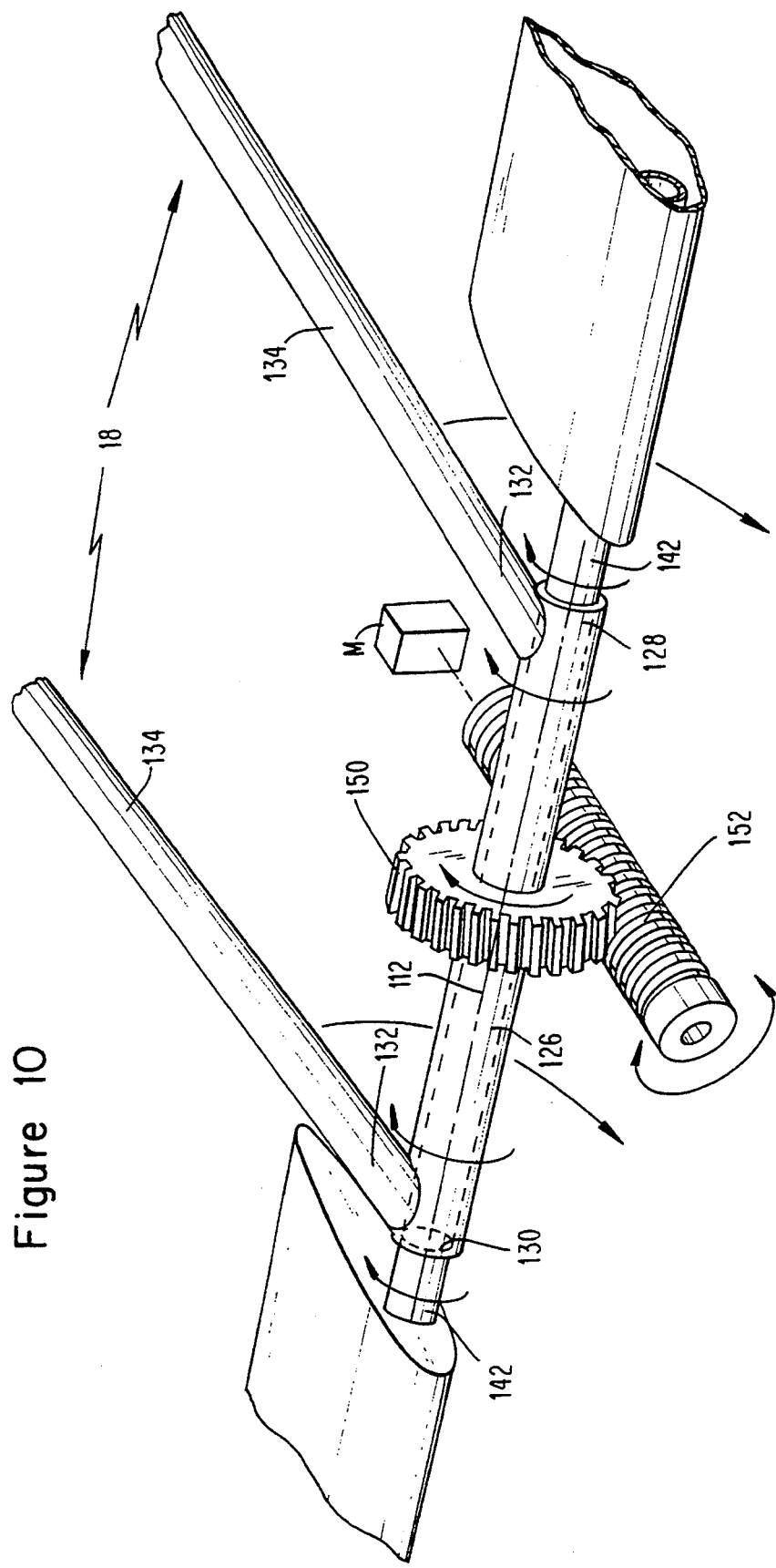
FIG. 10 is a perspective view, partly in schematic form, of a mechanism for pivoting the tail boom assembly relative to the fuselage, with the fuselage and fixed wing center sections omitted for ease of illustration.

An exemplary mechanism for pivoting the articulated tail boom assembly 120 relative to the fuselage 102 is best depicted in FIGS. 10 and 10A. Therein, a fixed worm gear 150 having the spanwise axis 112 as its axis of rotation is mounted to the cross tube 126 of the boom assembly 120 for meshing engagement with a second worm gear 152 which may have an axis of rotation extending parallel to the longitudinal axis of the fuselage 102. This second gear 152 may be driven by a motor means M controlled by the pilot to selectively rotate the cross tube 126 and thereby the boom assembly 120 via rotation of the driven gear 150.

In the alternative, the worm gearing arrangement 150,152 may be replaced with a bevel gearing arrangement or a rack and pinion arrangement, wherein the pinion gear is mounted to the boom cross tube 126 and the rack is mounted within the fuselage 102 for longitudinal translation to rotate the pinion and thereby the boom assembly 120.

Figure 11:
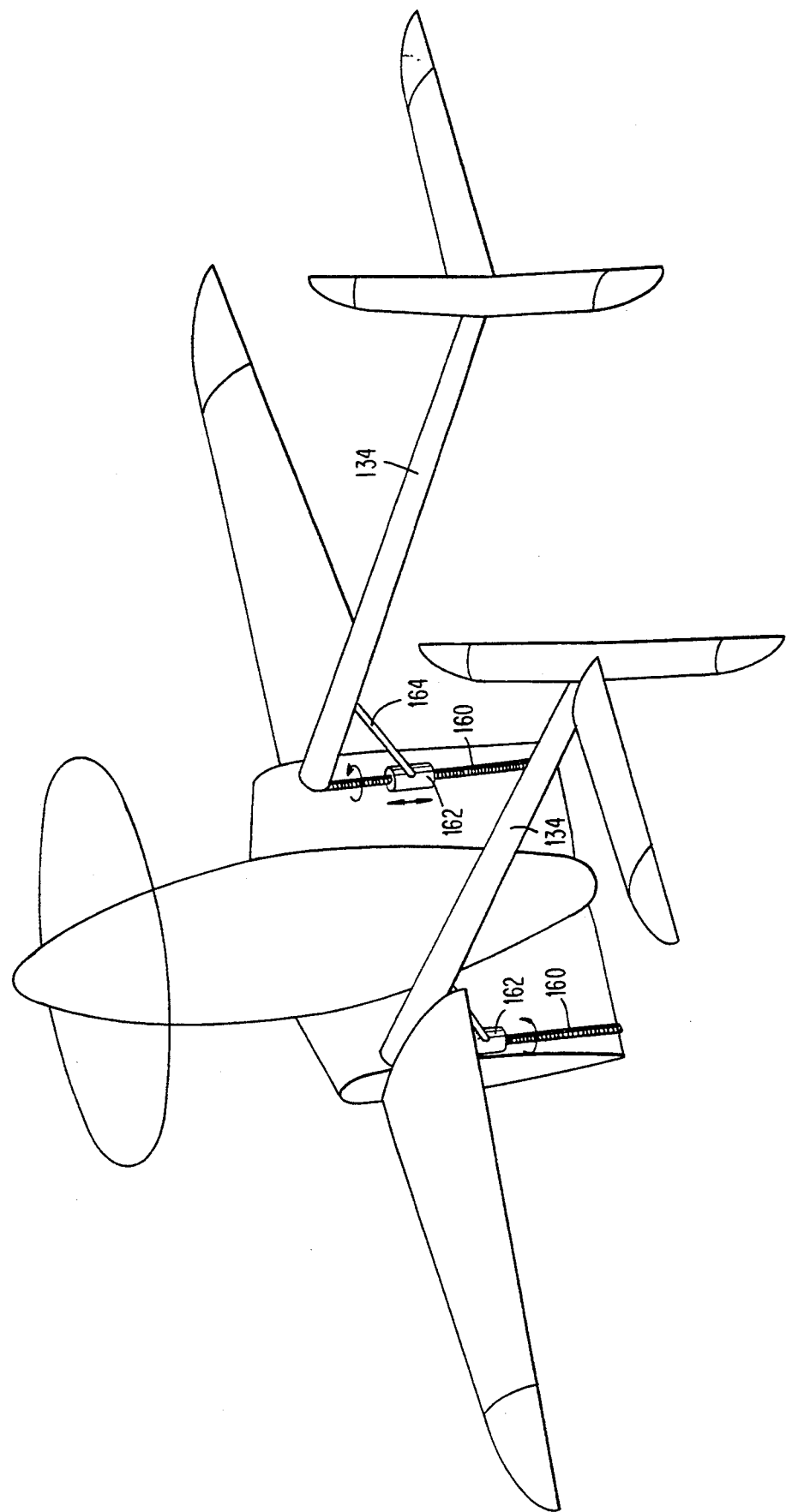
FIG. 11 is a perspective view, partly in schematic form, depicting a further mechanism for pivoting the tail boom assembly relative to the fuselage and fixed wing center sections.

In yet another alternative arrangement, schematically depicted in FIG. 11, a pair of threaded screw rods 160 are respectively mounted to or within the fixed wing root sections 122,124 of the fuselage 102 in threaded contact with a pair of threaded collars 162. Screw rods 162 extend longitudinally within the left and right fixed wing sections, respectively, and support in an axially fixed manner with journals (not shown) at opposite ends thereof. These screw rods 162 are rotated about their longitudinal axes in a manner which will now be apparent to one of ordinary skill so as to longitudinally translate the threaded collars 162 along their respective rods. A link 164 having opposite ends pivotally mounted to the associated collar 162 and boom rod 134 transmits longitudinal movement of the collars to pivot the boom assembly 120 relative to the fuselage 102. For the sake of simplicity, precise details as to the manner in which the aforementioned gearing arrangements may be mounted within the fuselage 102 and/or fixed wing root sections 122,124 to pivotally connect the boom assembly 120 to the fuselage will be omitted but are considered obvious to one of ordinary skill in the art based upon the disclosure herein.

The operation of the STOL free wing aircraft 100 of this invention will now be described.

With reference to FIGS. 2-5, the STOL aircraft 100 is depicted in straight and level flight. Assuming the pilot or remote control aircraft operator desires to land the aircraft 100 in a STOL free wing flight mode, the gearing 150,152 (or the alternate embodiments) is actuated to rotate the boom cross tube 126 on the spanwise axis 112 along the inner tube 142 (defining the free wing support tube) in the counter-clockwise direction of arrow A depicted in FIGS. 3 and 4. In actuality, as the boom is "raised," it is essentially maintained in its horizontal or straight and level flight mode of FIGS. 3 and 4 due to the dynamic pressure acting on its horizontal control surfaces 138 as a result of the straight and level direction of flight, and it is the fuselage 102 and the thrust line T of the propulsion system 104 which essentially rotates towards a vertical orientation with its nose pointed upwardly as best depicted in FIGS. 6-9. As the fuselage 102 and the thrust line T rotate towards the vertical, horizontal speed is gradually decreased and the vertical thrust vector gradually increases. The aircraft 100 thus slows and may be gradually lowered to the ground or otherwise flown (in level flight or climb) in this position. Throughout this transition, the free wings 114, 116 continue to be independently responsive to changes in the relative wind to either continue to provide lift assuming sufficient horizontal speed, or to "feather" as the vertical thrust vector increases to provide sufficient thrust control. At no time during the transition does the aircraft stall as a result of pivotal movement of the articulated tail boom assembly 120 in the unique manner described herein.

The feature of swinging or pivoting the entire boom assembly 120 and tail section 118 out of straight and level alignment with the fuselage 102 and the thrust line T of propulsion system 104 thereon advantageously results in an aircraft 100 capable of taking off and landing in slow flight or STOL mode while retaining the advantages of free wing flight as well as the following additional advantages. First, by locating the tail surfaces 138,140 on an articulated boom 120 in the aforesaid manner, a relatively short landing gear 160 attached to the fuselage 102 and fixed wing center sections 122,124 (see FIGS. 9 and 10A) may be utilized since the fuselage length is short (e.g., less than 50%) in relation to the overall length of the aircraft 100 as measured in the straight and level normal flight mode of FIGS. 2-5. This arrangement also lends itself to the utilization of a retractable nose gear assembly (not shown) attached to the fuselage 102. Secondly, by locating the tail and rudder surfaces 138,140 at the distal end of the boom 120, these tail surfaces are, in effect, cantilevered from the combined center of gravity of the fuselage 102,122,124 and wing 110. As a result, directional stability and yaw control is improved, even at very slow horizontal or forward speeds.

Since the tail surfaces 138, 140 are not subject to any dynamic pressure effects caused by the slip stream of propeller 108 when in the STOL flight mode of FIGS. 6-11, it will be appreciated that directional stability and yaw control deteriorates at extremely slow or 0 horizontal speeds as will occur during VTOL flight as opposed to STOL flight. The fixed wing center sections 122,124 advantageously remain in the slip stream and the dynamic pressure acting thereon tends to provide some degree of directional stability and yaw control. Further stability and control may be achieved with additional fins 162 (an exemplary one of which is depicted only in FIG. 10a) which may project outwardly from fuselage 102 or fixed wing sections 122, 124 to provide additional surfaces for improved stability and control. As will now occur to one of ordinary skill, such fins 162 may either continuously project from the fuselage or fixed wing sections, or may be retractably mounted therein to project from the fuselage and become operational only during VTOL flight.

The fixed wing root or center sections 122,124, in horizontal flight mode depicted in FIGS. 2-5, performs as a wing by generating lift in association with the left and right free wing sections 114,116. When the tail boom 120 is "raised," these fixed wing center sections 122,124 advantageously act as an aerodynamic brake (see, e.g., the FIG. 7 position) to rapidly decelerate the aircraft 100 to slow flight.

Specifications for an exemplary aircraft 100 according to this embodiment of the present invention for carrying a single passenger (pilot) are as follows:
  Tail and booms 120 swing 0 to 100 deg.
  Nosegear 160 retracts aft
  Elevons on freewing 114,116
  All fuel(35 lb) in fixed wing 122,124
  Gross weight=220 lb.
  Engine rotax 532 approx. 50 BHP
  Span=166 in.=13.8 ft.
  Area, freewings 114,116=14.7 sq. ft.
  Area, fixed wings 122,124=7.48 sq. ft.
  Reference Area Sr=25.3 sq. ft.
  Area horiz. tail 138=4.45 sq. ft.
  Area vert. tails 140=3.4 sq. ft.
  Wetted area=89 sq. ft. approx.

Figure 7:
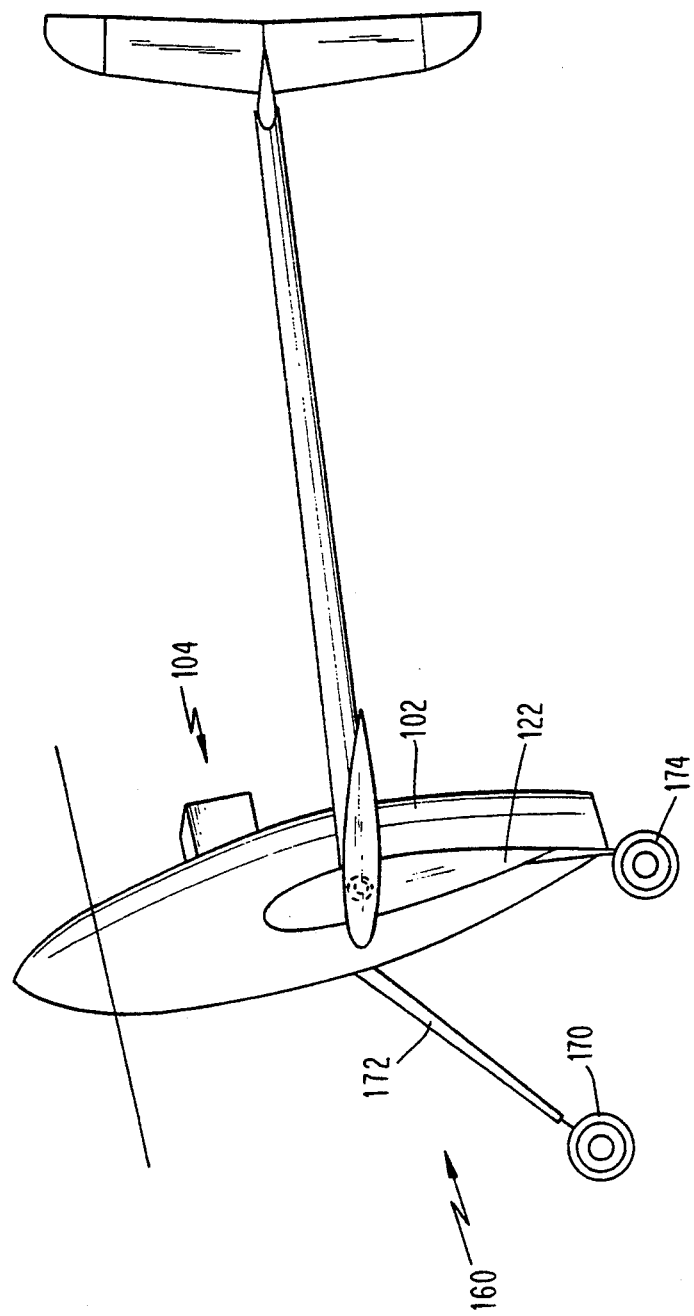
FIG. 7 is a side plan view of the aircraft in the VIOL/STOL orientation of FIG. 6.
Figure 8:
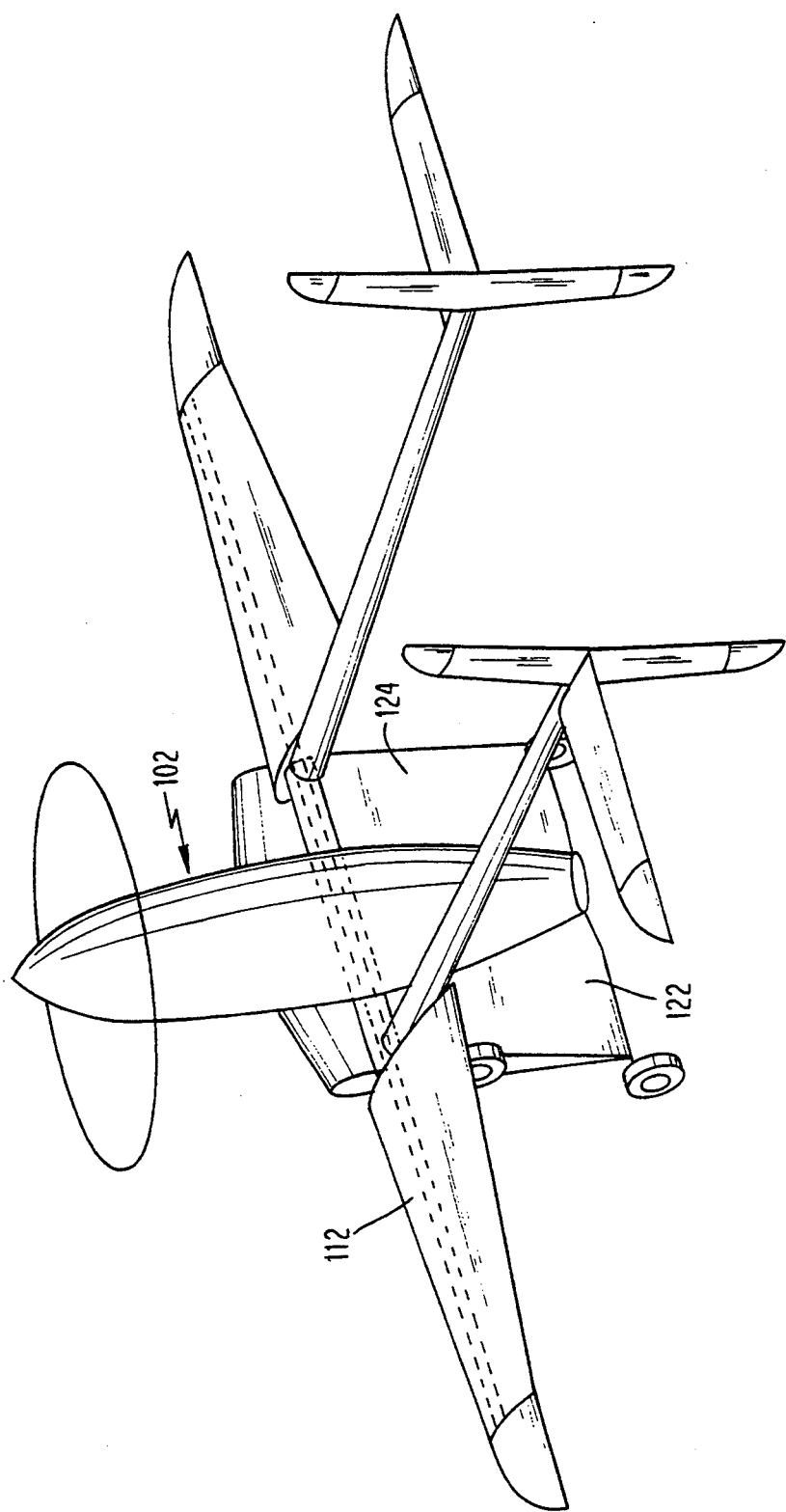
FIG. 8 is a rear perspective view of the aircraft depicted in FIGS. 6 and 7.
Figure 9:
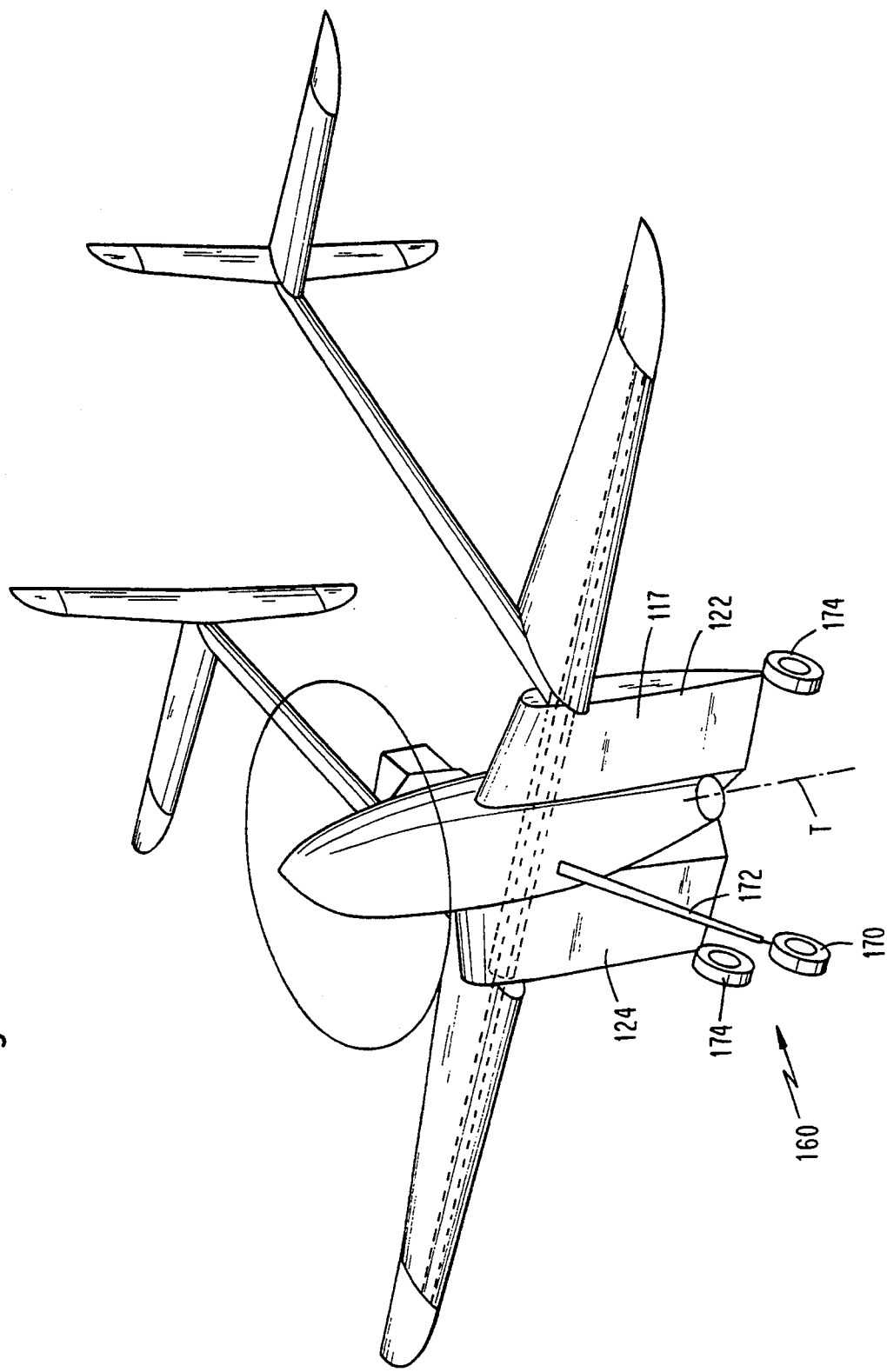
FIG. 9 is a front perspective view of the aircraft of FIG. 8.

FIGS. 7 and 9 schematically best depict the tricycle landing gear arrangement 160 which may be utilized with the aircraft 100 of this invention. Therein, the nose wheel 170 may be fixed to the lower end of a retractable (or telescopically extensible/collapsible) strut 172 attached to the underside of fuselage 102. The strut 172 is depicted in extended position in FIG. 7 wherein the fuselage 102 is depicted in tilt body position for STOL flight mode. A pair of main landing gear wheels 174 are secured to outboard trailing sections of the fixed wing center sections 122,124 to provide three point stability in cooperation with the nose wheel 170.

Optionally, the retractable strut 172 carrying the nose wheel 170 may be pivotally mounted to the fuselage 102, as can be the main landing gear wheels 174, for positioning to enable take-off and landing in a conventional straight and level flight mode. Details as to the mounting of the tricycle gear type landing wheels according to the alternative embodiments mentioned above will be obvious to one of ordinary skill based upon this specification.

To transition from vertical (take-off or flight) to horizontal flight, the reverse procedure is used. That is, the pilot or remote controller actuates the gearing arrangement 150,152 controlling the boom 120 to relatively rotate the boom from its position depicted in FIG. 7 to that depicted in FIG. 3. Assuming that the aircraft 100 is taking off, the aircraft is initially lifted by the propulsion system 104 from the landing field or platform. As the boom 120 is "lowered" in the direction opposite arrow A, the fuselage 102 pitches toward the horizontal which in turn causes the horizontal speed of the aircraft to increase. This in turn causes the freely rotatable wing 110 to rotate relative to the fuselage 102 in accordance with the relative wind. The effects of the relative wind acting on the freely rotating wing 110 quickly overcome the braking effects of the air flow over the fixed wing center sections 122,124 from the propulsion system 104 and, with increasing horizontal speed, the wing 110 develops lift. The aircraft 100 soon transitions into horizontal flight in a free wing straight and level flight mode.

Figure 12:
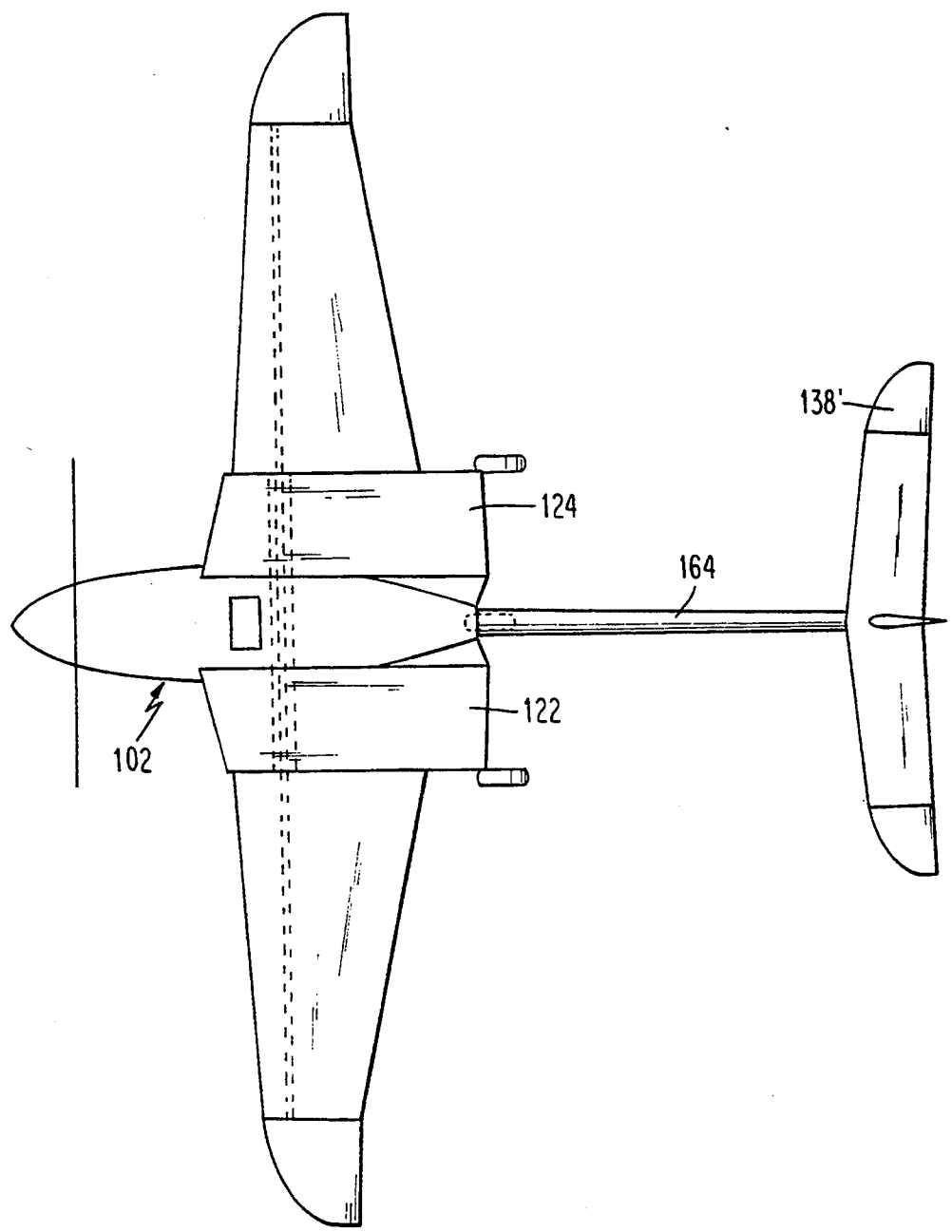
FIG. 12 is a top plan view, partly in schematic form, of the aircraft depicted in FIGS. 2-11 but formed with a single boom instead of a split tail boom.
Figure 13:
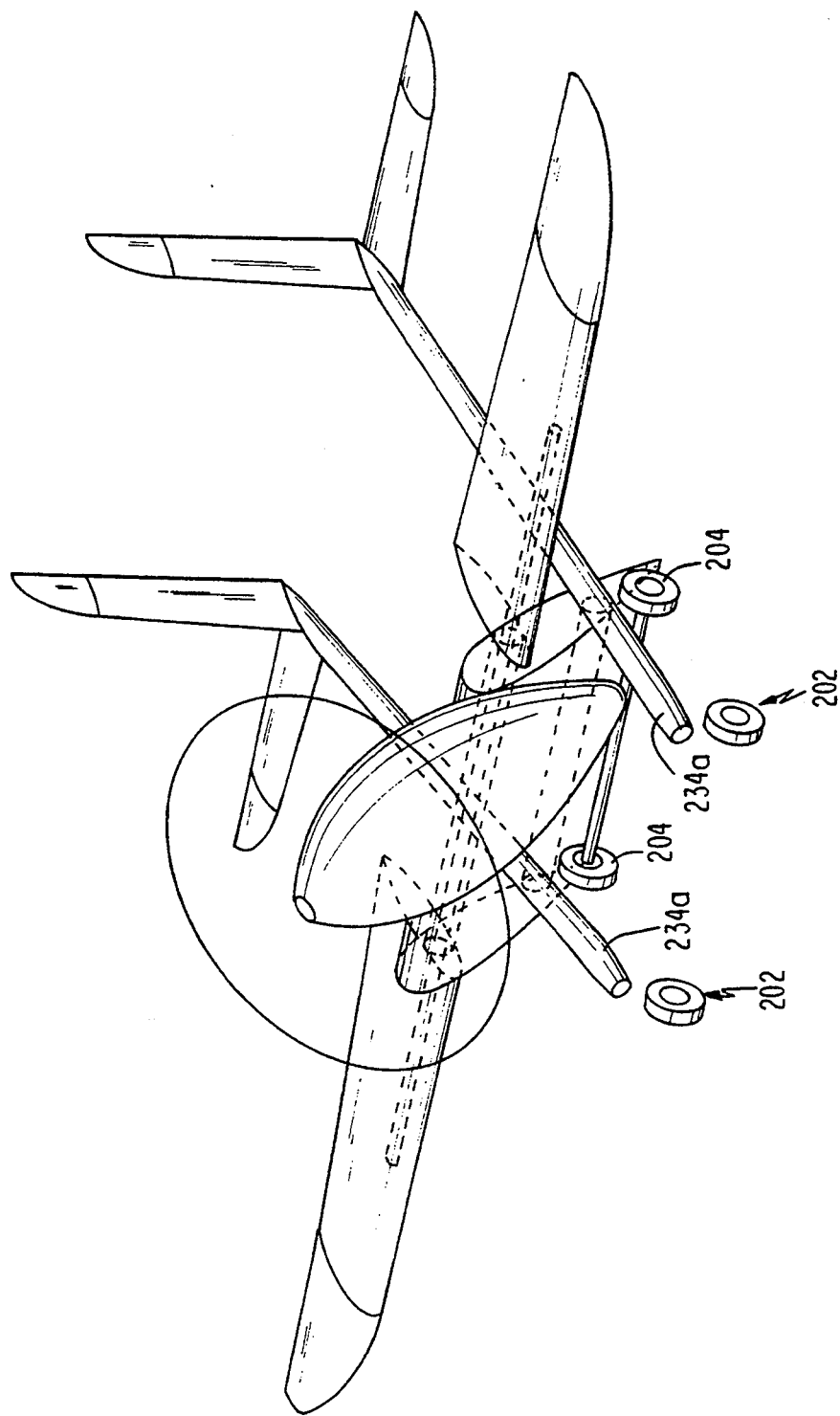
FIG. 13 is a perspective view of a preferred embodiment of a VIOL/STOL free wing aircraft in accordance with this invention depicting the fuselage in a tilted up and STOL configuration.

In an alternative embodiment such as schematically depicted in FIG. 12, the split boom 120 may be replaced with a single boom 164 to which the tail surfaces 138',140' are mounted. In this embodiment, the horizontal tail 138' may be fixed, relative to the boom 164, and the vertical tail 140' may be controlled as an all-flying rudder, relative to the boom, to provide for yaw control. However, an advantage of the split boom configuration 120 is that the tail surfaces 138,140 are located outwardly (or outboard) from the fuselage 102, in clear air, so that dynamic pressure conditions acting on these tail surfaces is improved, even at very slow horizontal or forward speeds.

In the STOL/VTOL or tilted body configuration depicted in FIG. 7, there is a tendency for the fuselage 102 to pivot or rotate about its longitudinal axis as a result of a cross wind acting upon the tail vertical surfaces 140 during either take-off or landing. Disadvantageously, this is primarily due to the moment arm generated by the cross wind acting on the tail vertical surfaces 140 at the cantilevered rear end 118 of the boom assembly 120 which is not counteracted by the tricycle landing gear due to the relatively close horizontal positioning of the nose wheel 170 to the main landing gear wheels 174.

Figure 2:
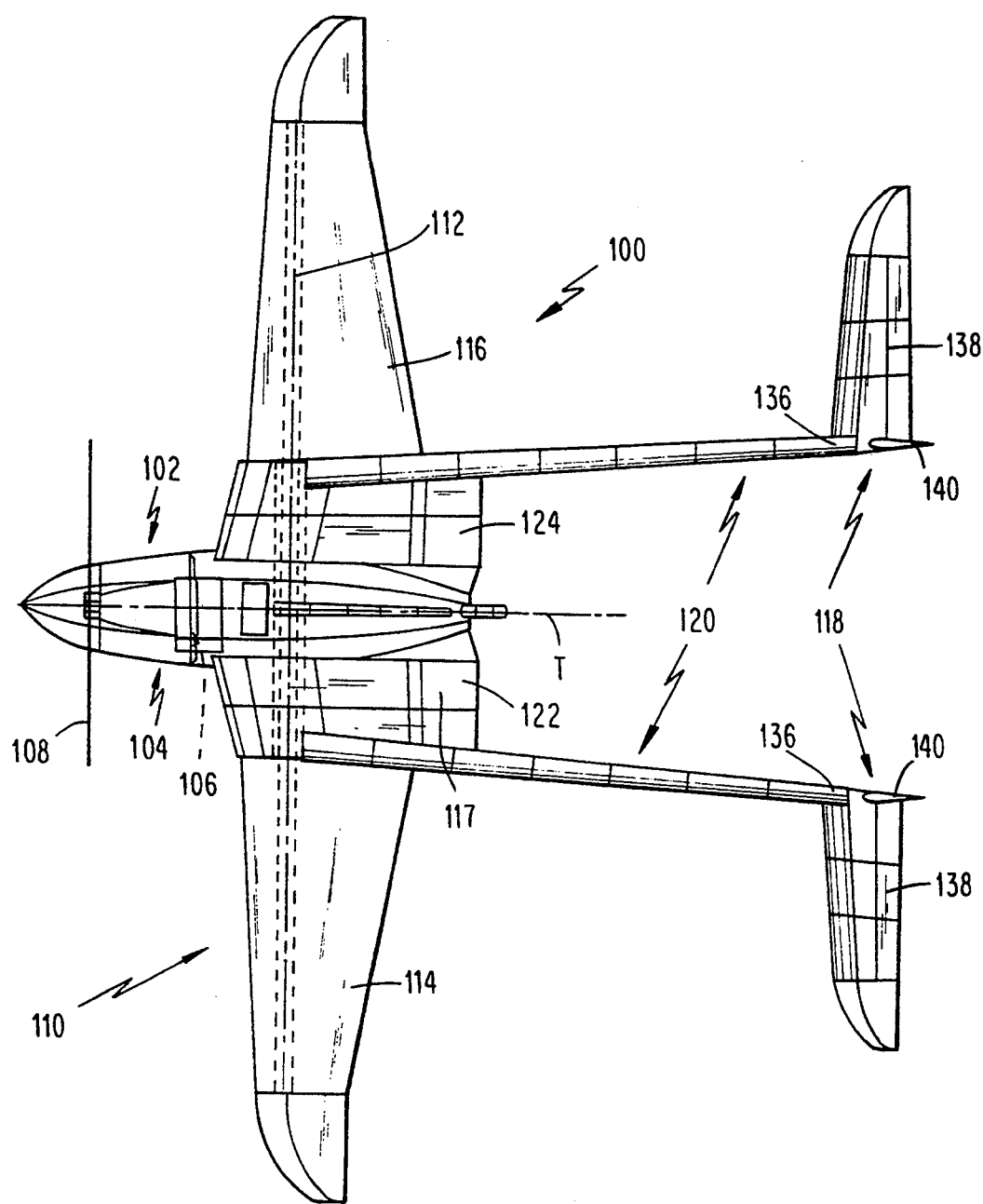
FIG. 2 is a top plan view of an aircraft according to one embodiment of the present invention in a straight and level mode of flight.

To overcome the potentially inherent stability of the FIG. 2 embodiment of aircraft 100 under cross wind conditions, the preferred embodiment of this invention is depicted in FIGS. 13-17, wherein an aircraft 200 features a landing gear arrangement having two pairs of landing wheels 202 and 204 mounted in tandem to each other to forward portions of a boom assembly 220 projecting forwardly from or proximate to a boom cross tube 226 mounted within the fuselage 227. More specifically, the cross tube 226 may be mounted in bearings (not shown) to extend transversely through the fuselage 227 and fixed wing center sections 222 and 224 and may be rotatable about its longitudinal axis 229 (extending transversely to the fuselage longitudinal axis), by means of one of the various types of pilot or remote operator controlled gearing arrangements similar or identical to those described hereinabove in connection with the FIG. 2 embodiment, to thereby swing the boom 220 (or tilt the thrust axis T) relative to the fuselage 227 as described hereinabove. Preferably, with reference to FIG. 14 only for simplicity of illustration, the boom axis of rotation (defining the pivot axis for fuselage 227 between STOL and straight and level flight modes) extends through a rear portion of the fuselage so that the rearward most end of the fuselage remains elevationally above the wheels 202, 204 even when tilted to its vertical most orientation. This means that a mechanism for inducing relative rotation between fuselage 227 and boom assembly 220 preferably acts against a forward portion of the fuselage to "push up" the forward portion from the straight and level FIG. 16 position to the tilted up or STOL/VTOL position of FIG. 14. A preferred mechanism similar to the threaded collar and screw rod arrangement of FIG. 11 features a pair of hinged struts 250 pivotally connected at their upper ends 252 to the underside of fuselage 227 with the lower strut ends pivotally attached to threaded collars 254, respectively threadedly secured to a pair of screw rods 256. By way of example only, screw rods 256 may be mounted to or within portions of booms 234 extending forwardly from boom cross tube 226 for longitudinal translating movement of the collars upon rotation of the screw rods in a manner analogous to rotation of screw rods 160 in the FIG. 11 embodiment. In this manner, struts 250 are operable to pivot fuselage 227 about boom tube 226 as the screw rods 256 rotate to advance threaded collars 254 in the forward direction to position the fuselage in the tilted up or STOL flight mode. Conversely, reverse rotation of screw rods 256 causes rearward movement of collars 254 to retract the struts 250 and thereby lower fuselage 227 to the FIG. 16 position.

Figure 3:
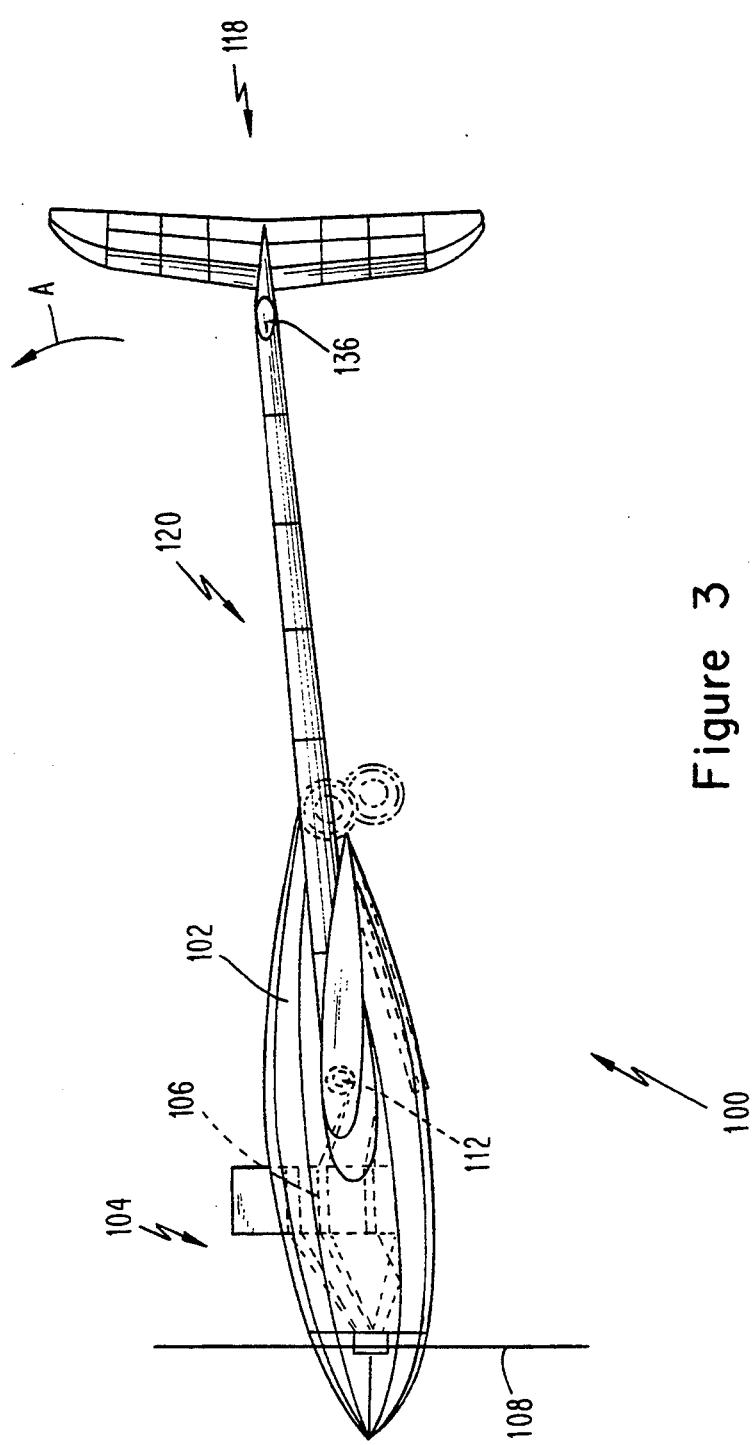
FIG. 3 is a side elevational view of the aircraft of FIG. 2 in the straight and level flight mode.
Figure 14:
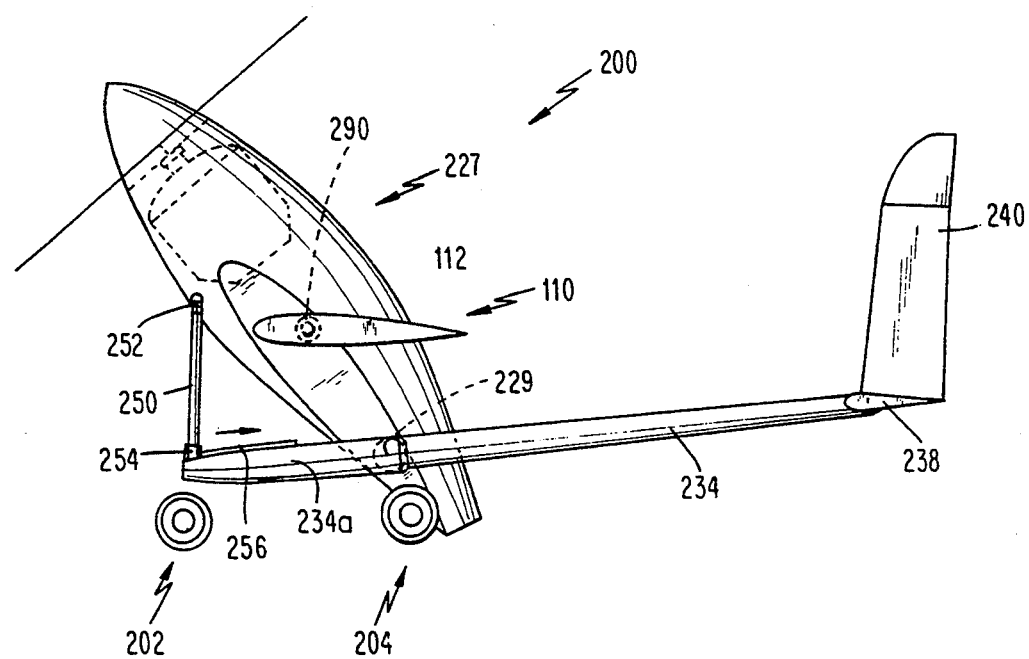
FIG. 14 is a side elevational view of the aircraft depicted in FIG. 13.
Figure 15:
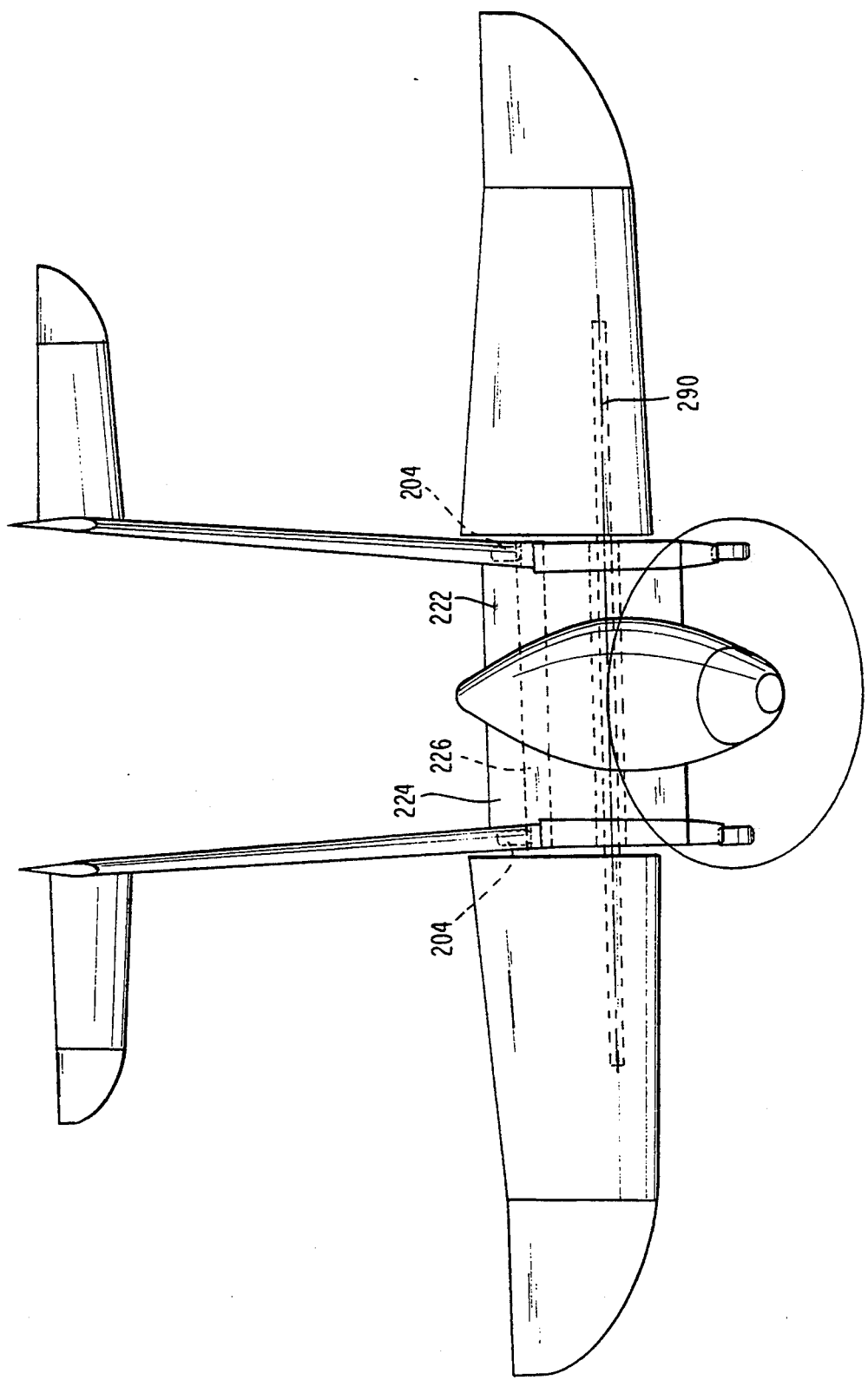
FIG. 15 is a top plan view of the aircraft depicted in FIGS. 13 and 14.
Figure 16:
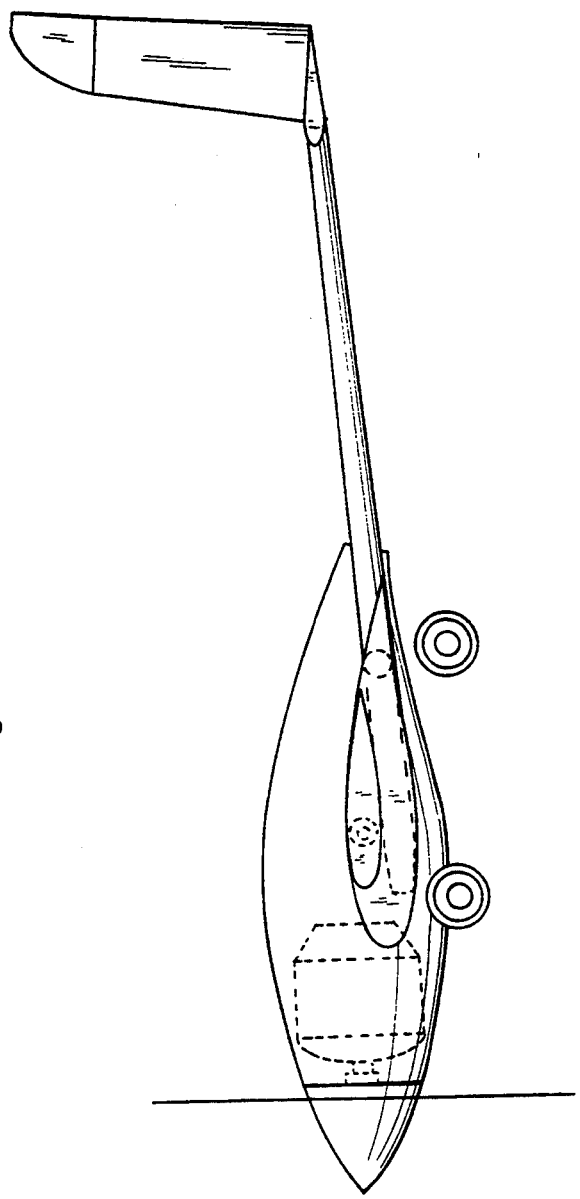
FIG. 16 is a side elevational view of the aircraft depicted in FIGS. 12-15 but with the fuselage in a straight and level flight condition relative to the tail boom assembly.
Figure 17:
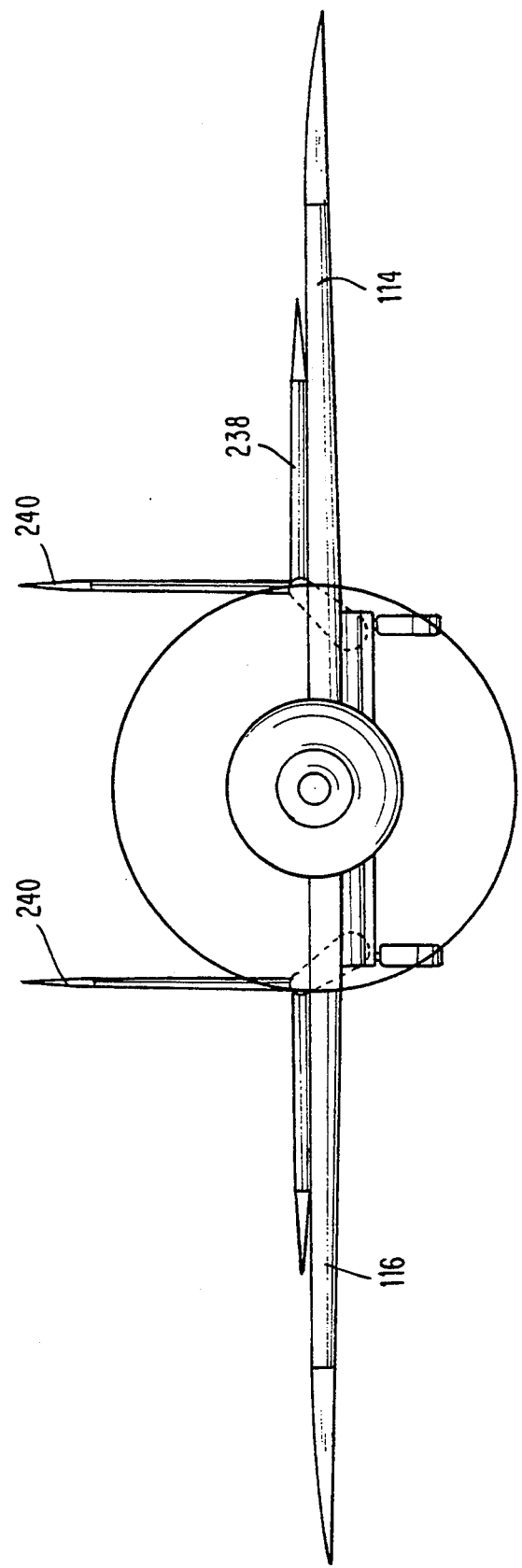
FIG. 17 is a front plan view of the aircraft of FIG. 16.

With the foregoing arrangement, transitioning between STOL/VTOL (tilted up) configurations as depicted in FIG. 14 and straight and level configuration as depicted in FIG. 16 aerodynamically occurs in the manner described hereinabove in connection with the FIG. 3 embodiment.

In this preferred embodiment, the left and right free wings 114,116 are mounted to the fixed wing center sections 222,224 with a cross tube 290 (defining spanwise axis 112) at a location spaced forwardly from and above the mounting of the boom cross tube 226 to the fuselage 27 (see, e.g., FIG. 14). The rear pair 204 of landing wheels are respectively mounted to the booms 234 proximate the boom cross tube 226 while the front pair 202 of landing wheels are respectively mounted to portions 234a of the booms 234 projecting forwardly from the cross tube. In this manner, the resulting landing gear provides for improved cross wind take-off performance due to the resistance provided by this four landing wheel configuration to yawing movement of the tilted up fuselage 227 about its longitudinal axis. This arrangement also advantageously allows the boom assembly 220 and the horizontal tail surfaces 238 to be lowered closer to the elevational plane of the wing (contrast FIG. 17 with FIG. 6) in the straight and level flight mode. This results in improved flight performance since the horizontal tail surfaces tend to be less affected by down wash from the freewing 110, i.e. less subjected to turbulence. Also, by positioning the boom assembly 220 close to and parallel to the ground results in lowering of the tail surfaces 240 to prevent toppling over of the aircraft during ground handling under high wind conditions.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. Aircraft, comprising:
   a. a fuselage including a source of propulsion for propelling the aircraft in a horizontal flight and in a short field take-off and landing (STOL) flight mode;
   b. a free wing connected to the fuselage for free pivotal movement relative thereto about a spanwise axis;
   c. a tail boom connected to the fuselage, said tail boom being formed with horizontal tail surfaces and vertical tail surfaces to provide for directional stability and yaw control; and
   d. a mechanism for pivoting the fuselage relative to the tail boom, independently from pivoting of said free wing about said spanwise axis, about an axis of pivot extending parallel to or coincident with the spanwise axis.

2. The aircraft of claim 1, wherein said mechanism is operable to position the thrust line of the fuselage into an angle approaching about 90° relative to a longitudinal axis of the tail boom to enable the thrust of the source of propulsion to propel the aircraft in the STOL flight mode.

3. The aircraft of claim 1, wherein forward portions of the tail boom are connected to the fuselage and the tail surfaces are located at the rearwardly extending portions of the boom, whereby said tail surfaces are positioned out of the propulsion slip stream in the STOL flight mode and provide for directional stability and yaw control as a result of relative wind induced dynamic pressure acting on the tail surfaces under the action of horizontal flight component speeds.

4. The aircraft of claim 1, wherein all the tail surfaces are immovable relative to the tail boom.

5. The aircraft of claim 1, further comprising landing wheels connected to the fuselage to project there below in the tilted up or STOL configuration of the fuselage relative to the tail boom.

6. The aircraft of claim 1, further comprising left and right fixed wing center or root sections fixedly attached to the fuselage, and wherein said free wing includes left and right free wing members respectively extending from the left and right fixed wing center sections and being freely rotatable relative thereto.

7. The aircraft of claim 6, further comprising means for selectively controllably rotating at least one of the left and right free wing members relative to the other of said wing members to adjust pitch for roll control without impeding the free pivotal movement thereof.

8. The aircraft of claim 6, further comprising a free wing support tube means for extending transversely through the fuselage and fixed wing sections along the spanwise axis and into the left and right free wing members to define a support therefor on the fuselage.

9. The aircraft of claim 8, wherein said free wing support tube means is a tube supported in at least one of the fuselage and fixed wing sections with bearings to allow for free pivotal movement of the free wing members as a result of relative wind induced free rotation of the tube about its longitudinal axis.

10. The aircraft of claim 8, wherein said free wing support tube means includes a pair of tubes respectively extending from the left and right free wing members into the left and right fixed wing center sections, and further comprising means for selectively controllably pivoting at least one of the left and right free wing members relative to the other of said wing members, for roll control without impeding the free pivotal movement thereof, by engagement with said pair of tubes.

11. The aircraft of claim 8, wherein said tail boom includes a cross tube extending transversely through both the fuselage and fixed wing center sections and is rotatable about its longitudinal axis via bearings mounted in at least one of the fuselage and fixed wing center sections, and a pair of tail boom members respectively attached to opposite ends of the cross tube to project rearwardly therefrom, said tail surfaces being formed at distal ends of the tail boom members.

12. The aircraft of claim 11, wherein said free wing support tube means extends coaxially through the tail boom cross tube and is freely relatively rotatable with respect thereto so that both share a common axis of rotation coincident with the spanwise axis.

13. The aircraft of claim 11, wherein said tail boom cross tube extends transversely through a rear portion of the fuselage in rearwardly spaced relation to the free wing axis of rotation.

14. The aircraft of claim 13, wherein portions of the tail boom members extend forwardly from the tail boom cross tube, and two pairs of front and rear landing wheels are respectively mounted to the tail boom members in tandem spaced relationship.

15. The aircraft of claim 14, wherein at least the front pair of landing wheels is mounted to the forwardly extending portions of the tail boom members.

16. The aircraft of claim 15, wherein said mechanism for pivoting the fuselage relative to the tail boom comprises at least a pair of struts pivotally attached to one of the fuselage and fixed wing center sections at first ends,- thereof, said struts being pivotally attached to a pair of threaded collars at the opposite ends thereof, and at least a pair of screw rods mounted to the tail boom members for respective rotation about their longitudinal axes to induce longitudinal translating movement of the threaded collars along the screw rods and thereby raising and lowering movement of the struts to thereby selectively pivot the fuselage relative to the tail boom.

17. The aircraft of claim 16, wherein the points of attachment of the struts to at least one of the fuselage and fixed wing center sections are located forwardly of the tail boom cross tube to allow for upward and downward rotational movement of the fuselage nose about the fuselage axis of pivot extending through the tail boom cross tube.

18. The aircraft of claim 17, wherein the points of attachment of the strut to at least one of the fuselage and fixed wing center sections are located forwardly of the spanwise axis.

19. The aircraft of claim 1, further comprising auxiliary flight control surfaces projecting from the fuselage and being acted upon by the source of propulsion slip stream to provide for directional stability and yaw control when the tail boom is rotated relative to the thrust line of the fuselage into a 90° configuration to thereby enable the aircraft to take off and land in VTOL flight mode under substantially zero horizontal flight speed.

20. The aircraft of claim 1, wherein said spanwise axis is located forwardly of the aerodynamic center of the free wing.

21. A method of propelling an aircraft in generally vertical and horizontal flight modes, comprising the steps of:
  a. propelling the aircraft in one of said flight modes with a pair of wings being freely pivotable relative to a fuselage in accordance with aerodynamic forces acting on the wings and the fuselage; and
  b. relatively pivoting the fuselage so that (1) a longitudinal axis thereof is in substantial alignment with tail surfaces projecting rearwardly from the fuselage in a straight and level or horizontal flight mode or (2) the fuselage and longitudinal axis thereof is oriented generally vertically and substantially perpendicular to the tail surfaces in a vertical flight mode.

* * * * *